（12） United States Patent
Kurian (10) Patent No.: US 10,019,718 B2
(45) Date of Patent: Jul. 10, 2018

(54) CUSTOMER-BASED ASSOCIATE INTERFACES (71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 469 days.

(21) Appl. No.: 14/710,430

(22) Filed: May 12, 2015

(65) Prior Publication Data

US 2016/0335644 A1    Nov. 17, 2016

(51) Int. Cl.
G06Q 30/00    (2012.01)
H04M 7/00    (2006.01)

(52) U.S. Cl.
CPC .......... G06Q 30/016 (2013.01); H04M 7/006 (2013.01)

(58) Field of Classification Search
CPC ........ G06Q 20/00; G06Q 30/04; G06Q 30/06; G06Q 30/016
USPC .......................................................... 705/43
See application file for complete search history.

(56) References Cited

U.S. PATENT DOCUMENTS

5,923,756 A    7/1999  Shambroom
6,615,258 B1 *  9/2003  Barry ................. G06F 11/0709
                                                 707/E17.107
6,954,792 B2  10/2005  Kang et al.
7,287,080 B2  10/2007  Talanis et al.
7,321,971 B2   1/2008  Wilding et al.
7,346,773 B2   3/2008  Cam-Winget et al.
7,404,002 B1   7/2008  Pereira
7,493,331 B2   2/2009  McGrew
7,610,348 B2  10/2009  Kisley et al.
7,613,919 B2  11/2009  Bagley
7,676,596 B1   3/2010  Pereira
7,944,575 B2   5/2011  Yasunaga
7,975,139 B2   7/2011  Coulier
8,214,537 B2   7/2012  Miura
8,296,460 B2  10/2012  Inagaki
8,838,726 B2   9/2014  Srinivas et al.
8,904,178 B2  12/2014  Wilding et al.
(Continued)

Primary Examiner — Jagdish Patel
Assistant Examiner — Liz P Nguyen
(74) Attorney, Agent, or Firm — Banner & Witcoff, Ltd.; Michael A Springs (57) ABSTRACT A computing system may generate a customer interface comprising a listing of transactions of a customer and one or more user-selectable options for the customer to utilize to identify a subset of the transactions relevant to an inquiry and may communicate the customer interface to a computing device associated with the customer. The computing system may receive, from the computing device associated with the customer, data, generated by the computing device associated with the customer in response to the customer invoking the user-selectable option(s), identifying the subset of the transactions relevant to the inquiry. The computing system may generate an associate interface comprising a listing of the subset of the transactions relevant to the inquiry and omitting or obscuring one or more of the transactions that are not amongst the subset relevant to the inquiry and may communicate the associate interface to a computing device associated with an associate.

17 Claims, 7 Drawing Sheets (56) References Cited

U.S. PATENT DOCUMENTS

| | | | |
|---|---|---|---|
| 8,965,798 B1 * | 2/2015 | Mackrell | G06Q 20/00 705/30 |
| 2010/0095059 A1 | 4/2010 | Kisley et al. | |
| 2013/0324046 A1 | 12/2013 | Xue | |
| 2014/0215215 A1 | 7/2014 | Tanaka | |
| 2014/0219495 A1 | 8/2014 | Hua | |
| 2014/0379793 A1 | 12/2014 | Srinivas et al. | |

* cited by examiner

Transactions Relevant to Inquiry

| Date | Time | Description | Debit | Credit |
|---|---|---|---|---|
| FRI ##-##-#### | ##:## | \<Employer1\> | | $#,###.## |
| MON ##-##-#### | ##:## | \<Merchant1\> | $##.## | |
| MON ##-##-#### | ##:## | \<Merchant2\> | $##.## | |
| TUE ##-##-#### | ##:## | \<Merchant1\> | $##.## | |
| TUE ##-##-#### | ##:## | \<Merchant3\> | $##.## | |
| TUE ##-##-#### | ##:## | \<Merchant4\> | $##.## | |
| WED ##-##-#### | ##:## | \<Merchant1\> | $##.## | |
| WED ##-##-#### | ##:## | \<Merchant5\> | $##.## | |
| WED ##-##-#### | ##:## | \<Merchant6\> | $##.## | |
| THU ##-##-#### | ##:## | \<Merchant1\> | $##.## | |
| THU ##-##-#### | ##:## | \<Merchant7\> | $##.## | |
| FRI ##-##-#### | ##:## | \<Employer1\> | | $#,###.## |
| FRI ##-##-#### | ##:## | \<Merchant1\> | $##.## | |

CUSTOMER-BASED ASSOCIATE INTERFACES

BACKGROUND

Many organizations provide their associates with access to customer transaction data to enable the associates to assist customers with their inquiries. Often, however, associates are provided access to transaction data of a customer that is not relevant to the customer's inquiry, and such access may present unnecessary security or privacy risks. Accordingly, a need exists for customer-based associate interfaces.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a computing system may generate a customer interface comprising a listing of transactions of a customer of an organization with the organization and one or more user-selectable options for the customer to utilize to identify a subset of the transactions relevant to an inquiry and may communicate the customer interface to a computing device associated with the customer. The computing system may receive, from the computing device associated with the customer, data, generated by the computing device associated with the customer in response to the customer invoking the user-selectable option (s), identifying the subset of the transactions relevant to the inquiry. The computing system may generate an associate interface comprising a listing of the subset of the transactions relevant to the inquiry and omitting or obscuring one or more of the transactions that are not amongst the subset relevant to the inquiry and may communicate the associate interface to a computing device associated with an associate designated to assist the customer with the inquiry.

In some embodiments, the computing device associated with the customer may be a mobile device executing an application provided by the organization. In such embodiments, the computing system may generate an interface configured for the application and may receive data generated by the mobile device in response to the customer invoking, via the application, the user-selectable option(s).

In some embodiments, the organization may be a financial institution. In such embodiments, the computing device associated with the customer may be an automated (or automatic) teller machine (ATM), and the computing system may generate an interface configured for the ATM and may receive data generated by the ATM in response to the customer invoking, via the ATM, the user-selectable option (s). Additionally or alternatively, the computing device associated with the customer may be a kiosk comprising a touchscreen display, and the computing system may generate an interface configured for the kiosk and may receive data generated by the kiosk in response to the customer invoking, via the touchscreen, the one or more user-selectable options. The kiosk may be physically located at a branch location of the financial institution (e.g., a branch where the computing device associated with the associate, the associate, and the customer are physically located) and may be physically oriented such that the touchscreen is visible to the customer and obscured from the associate.

In some embodiments, the computing system may generate data configured to cause the computing device associated with the associate to close the associate interface and may communicate the data to the computing device associated with the associate. For example, the computing system may generate and communicate the data configured to cause the computing device associated with the associate to close the associate interface in response to receiving, from the computing device associated with the customer, data indicating that the customer has concluded their interaction with the associate. Additionally or alternatively, the computing system may generate and communicate the data configured to cause the computing device associated with the associate to close the associate interface in response to determining that a predetermined amount of time has passed since the associate interface was communicated by the computing system to the computing device associated with the associate. In some embodiments, the computing system may establish a voice over Internet protocol (VoIP) session between the computing device associated with the customer and the computing device associated with the associate. In such embodiments, the computing system may generate and communicate the data configured to cause the computing device associated with the associate to close the associate interface in response to determining that the VoIP session has been terminated.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
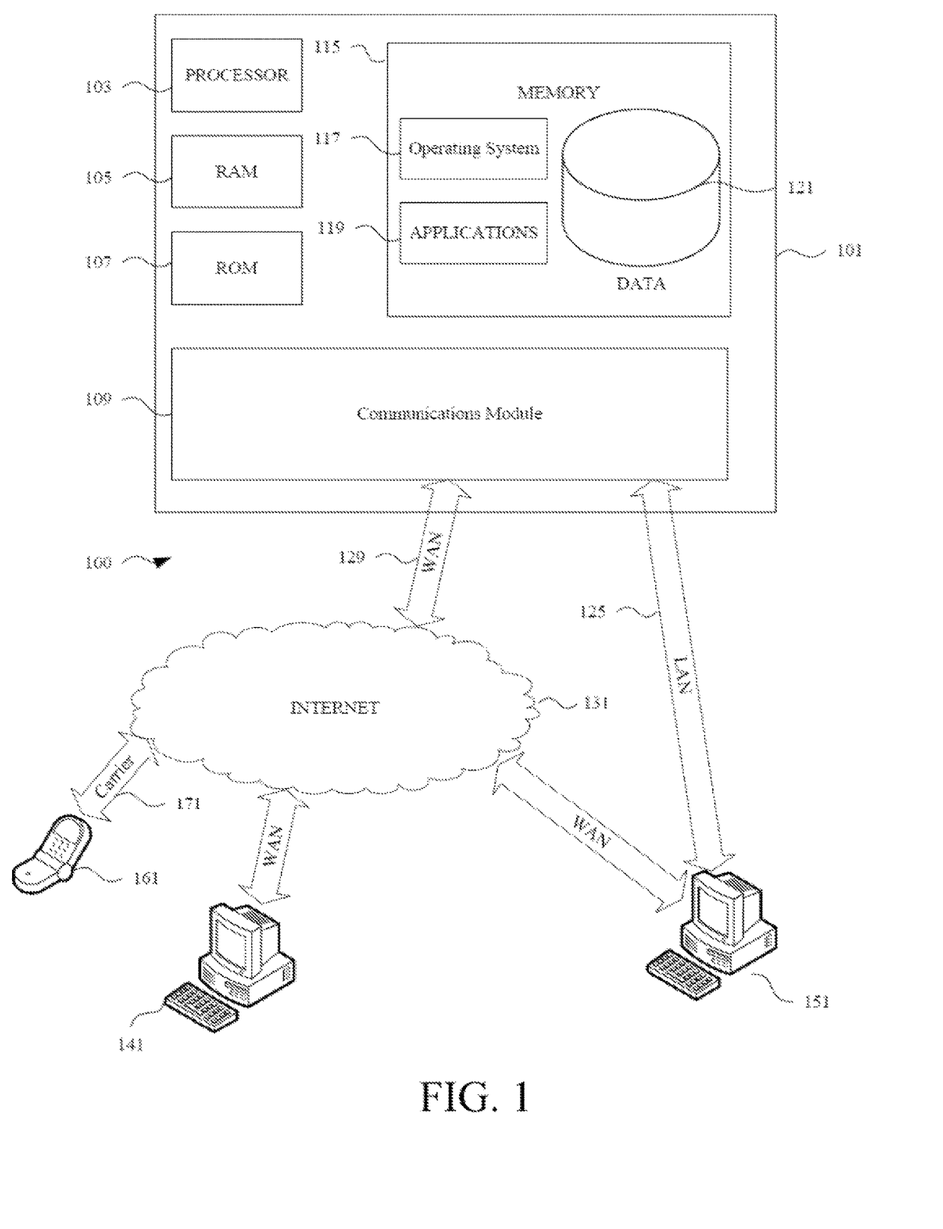
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
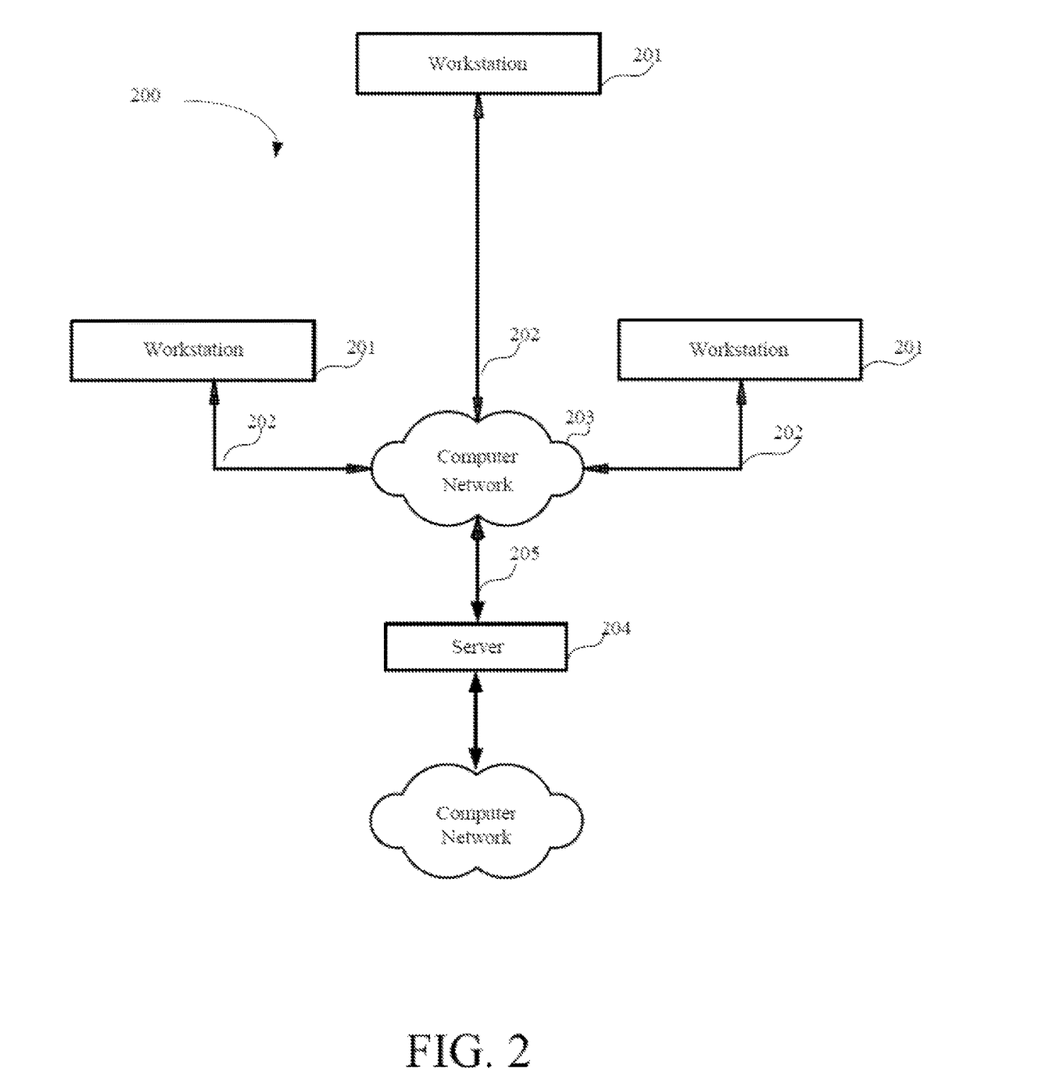
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
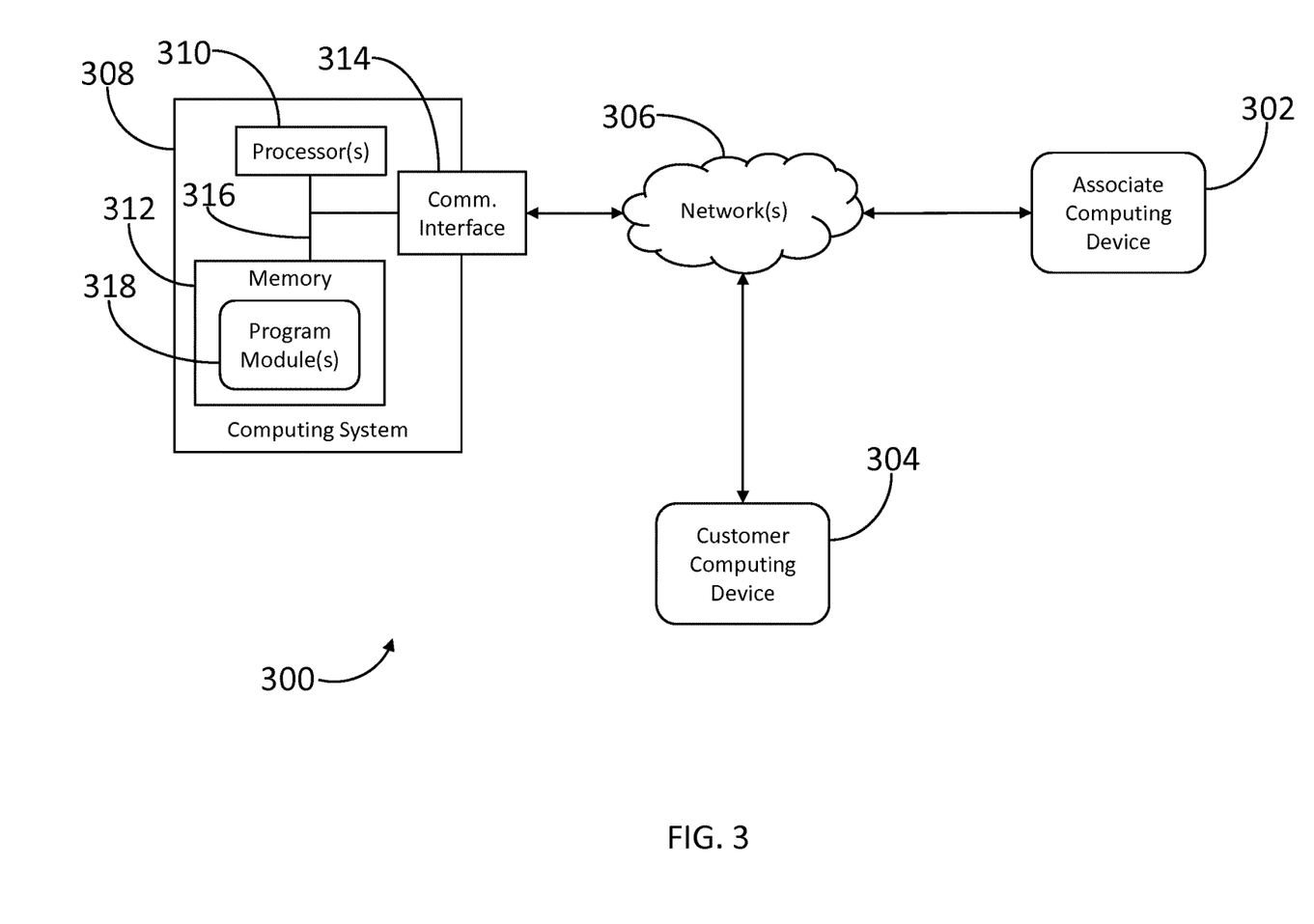
FIG. 3 depicts an illustrative computing environment for employing customer-based associate interfaces in accordance with one or more example embodiments.

FIG. 3 depicts an illustrative computing environment for employing customer-based associate interfaces in accordance with one or more example embodiments. Referring to FIG. 3, computing environment 300 may be associated with one or more organizations (e.g., corporations, universities, government entities, healthcare providers, financial institutions, or the like) and may include one or more computing devices. For example, computing environment 300 may include computing devices 302 and 304. Computing devices 302 and 304 may include one or more of any type of computing device (e.g., desktop computer, laptop computer, tablet computer, smart phone, server, server blade, mainframe, virtual machine, or the like) configured to perform one or more of the functions described herein. Computing environment 300 may also include one or more networks. For example, computing environment 300 may include network(s) 306, which may include one or more sub-networks (e.g., LANs, WANs, VPNs, or the like) and may interconnect computing devices 302 and 304.

Computing environment 300 may also include one or more computing systems. For example, computing environment 300 may include computing system 308. Computing system 308 may include one or more of any type of computing device (e.g., desktop computer, laptop computer, tablet computer, smart phone, server, server blade, mainframe, virtual machine, or the like) configured to perform one or more of the functions described herein. In some embodiments, computing system 308 may include one or more of computing devices 302 or 304. Computing system 308 may include one or more processor(s) 310, memory 312, communication interface 314, and/or data bus 316. Data bus 316 may interconnect processor(s) 310, memory 312, and/or communication interface 314. Communication interface 314 may be a network interface configured to support communications between computing system 308 and network(s) 306 (or one or more sub-networks thereof) (e.g., communications between computing system 308 and one or more of computing devices 302 or 304). Memory 312 may include one or more program modules comprising instructions that when executed by processor(s) 310 cause computing system 308 to perform one or more functions described herein. For example, memory 312 may include program module(s) 318, which may comprise instructions that when executed by processor(s) 310 cause computing system 308 to perform one or more functions described herein.

Figure 4:
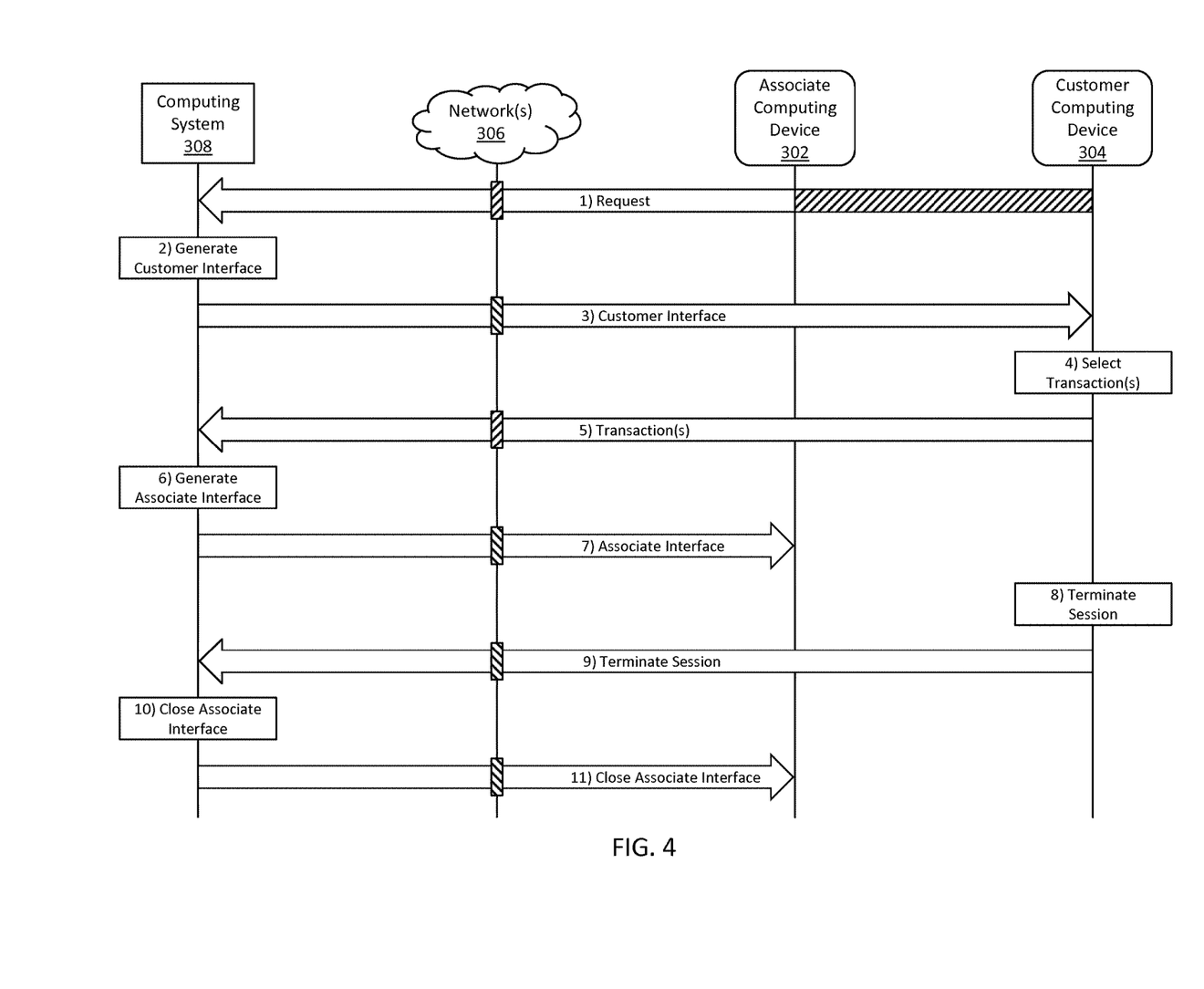
FIG. 4 depicts an illustrative event sequence for employing customer-based associate interfaces in accordance with one or more example embodiments.

FIG. 4 depicts an illustrative event sequence for employing customer-based associate interfaces in accordance with one or more example embodiments. Referring to FIG. 4, at step 1, computing device 302 and/or 304 may generate a request indicating that a customer of the organization associated with computing environment 300 has initiated an inquiry and may communicate (e.g., via network(s) 306, as indicated by the shaded box over the line extending downward from network(s) 306) the request to computing system 308, which may receive the request (e.g., via communication interface 314). For example, computing device 304 may be a computing device associated with the customer and computing device 302 may a computing device associated with an associate of the organization designated to assist the customer with the inquiry, and, responsive to the customer initiating the inquiry (e.g., via computing device 304 and/or by interacting with the associate designated to assist the customer with the inquiry (e.g., an associate utilizing computing device 302)), computing device 302 and/or 304 may generate the request and may communicate the request to computing system 308. In some embodiments, computing device 304 may be a mobile device executing an application provided by the organization. In some embodiments, the organization associated with computing environment 300 may be a financial institution. In such embodiments, computing device 304 may be an automated (or automatic) teller machine (ATM). Additionally or alternatively, computing device 304 may be a kiosk comprising a touchscreen display. The kiosk may be physically located at a branch location of the financial institution (e.g., a branch where computing device 302, the associate, and the customer are physically located) and may be physically oriented such that the touchscreen is visible to the customer and obscured from the associate (e.g., to ensure the customer's privacy).

Figure 5:
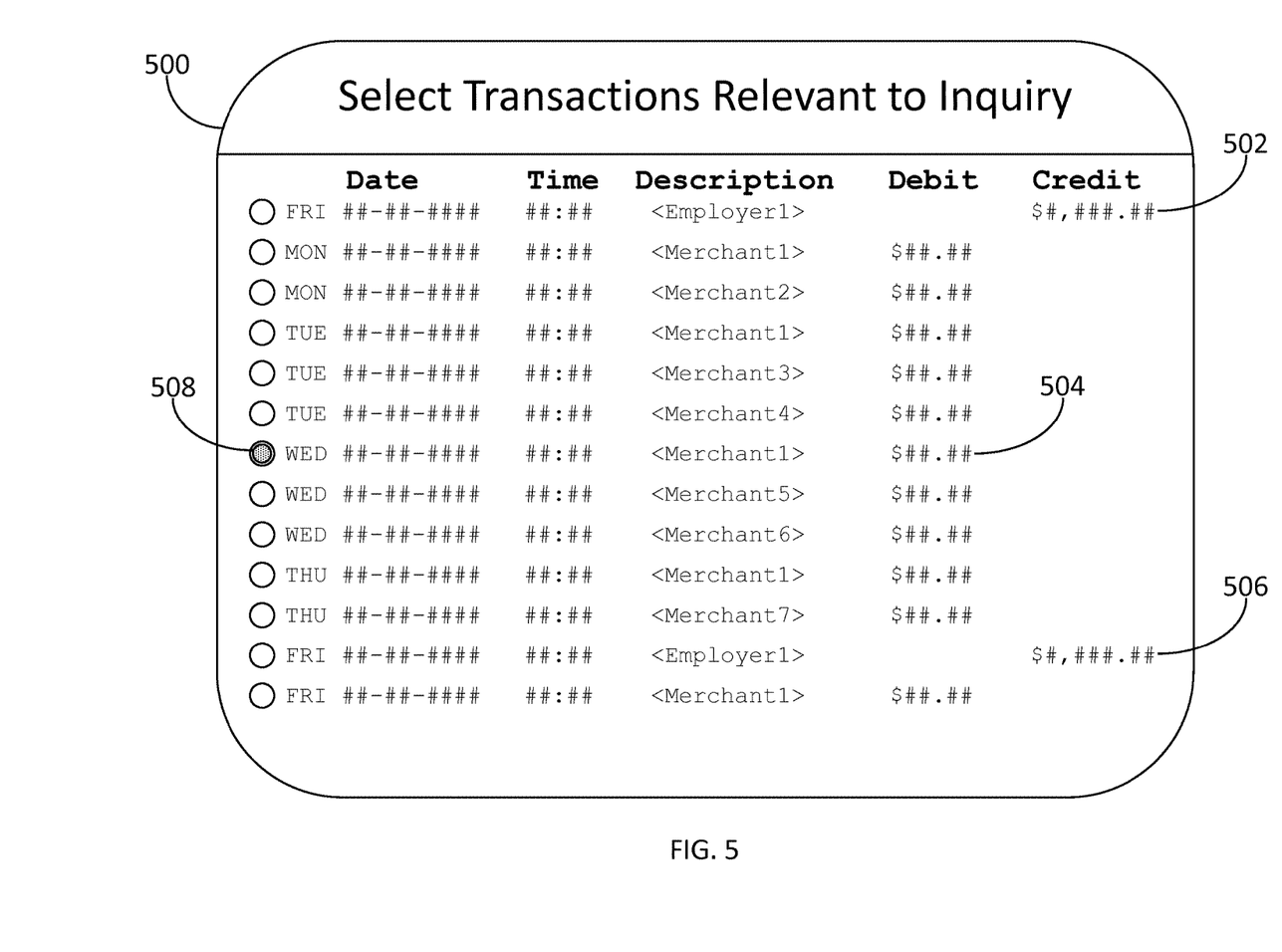
FIG. 5 depicts an illustrative customer interface for employing customer-based associate interfaces in accordance with one or more example embodiments.

Responsive to receiving the request, at step 2, computing system 308 may generate a customer interface comprising a listing of transactions of the customer with the organization and one or more user-selectable options for the customer to utilize to identify a subset of the transactions relevant to the inquiry and, at step 3, may communicate (e.g., via communication interface 314 and network(s) 306) the customer interface to computing device 304, which may receive and display the customer interface. For example, FIG. 5 depicts an illustrative customer interface for employing customer-based associate interfaces in accordance with one or more example embodiments. Referring to FIG. 5, customer interface 500 may comprise a listing of transactions of the customer with the organization (e.g., the listing including transactions 502, 504, and 506) and one or more user-selectable options for the customer to utilize to identify a subset of the transactions relevant to the inquiry (e.g., the user-selectable options including user-selectable option 508 corresponding to transaction 504). Returning to FIG. 4, at step 4, the customer may utilize the customer interface (e.g., invoke one or more of the user-selectable options) to select the subset of the transactions relevant to the inquiry, and, at step 5, computing device 304 may generate (e.g., based on the customer's selection) data identifying the subset of the transactions relevant to the inquiry and may communicate (e.g., via network(s) 306) the data identifying the subset of the transactions relevant to the inquiry to computing system 308, which may receive (e.g., via communication interface 314) the data identifying the subset of the transactions relevant to the inquiry. For example, the customer may utilize (e.g., invoke) user-selectable option 508 to select (or designate) transaction 504 as a transaction relevant to the inquiry, and computing device 304 may generate data identifying transaction 504 as relevant to the inquiry and may communicate the data identifying transaction 504 as relevant to the inquiry to computing system 308.

As indicated above, in some embodiments, computing device 304 may be a mobile device executing an application provided by the organization (e.g., a mobile-banking application provided by a financial institution). In such embodiments, computing system 308 may generate an interface configured for the application, and computing device 304 may generate the data identifying the subset of the transactions relevant to the inquiry (e.g., the data identifying transaction 504 as relevant to the inquiry) in response to the customer invoking, via the application, the user-selectable option(s) (e.g., user-selectable option 508). In other embodiments, computing device 304 may be an ATM. In such embodiments, computing system 308 may generate an interface configured for the ATM, and computing device 304 may generate the data identifying the subset of the transactions relevant to the inquiry (e.g., the data identifying transaction 504 as relevant to the inquiry) in response to the customer invoking, via the ATM, the user-selectable option(s) (e.g., user-selectable option 508). Additionally or alternatively, computing device 304 may be a kiosk comprising a touchscreen display, and computing system 308 may generate an interface configured for the kiosk, and computing device 304 may generate the data identifying the subset of the transactions relevant to the inquiry (e.g., the data identifying transaction 504 as relevant to the inquiry) in response to the customer invoking, via the touchscreen, the user-selectable option(s) (e.g., user-selectable option 508).

Figure 6:
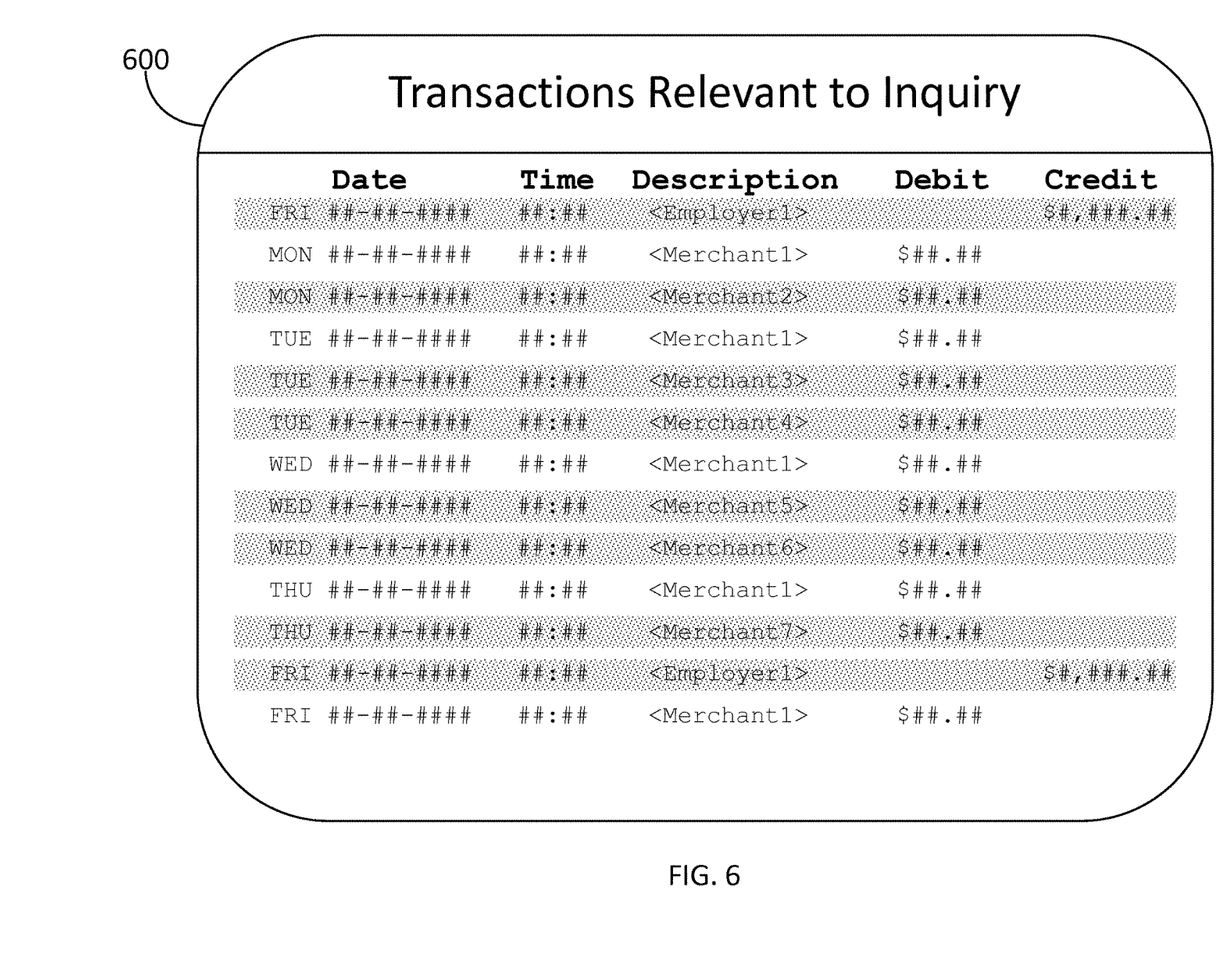
FIG. 6 depicts an illustrative associate interface for employing customer-based associate interfaces in accordance with one or more example embodiments.

Responsive to receiving the data identifying the subset of the transactions relevant to the inquiry, at step 6, computing system 308 may generate an associate interface comprising a listing of the subset of the transactions relevant to the inquiry and omitting or obscuring one or more of the transactions that are not amongst the subset relevant to the inquiry and, at step 7, may communicate (e.g., via communication interface 314 and network(s) 306) the associate interface to computing device 302, which may receive and display the associate interface. For example, FIG. 6 depicts an illustrative associate interface for employing customer-based associate interfaces in accordance with one or more example embodiments. Referring to FIG. 6, associate interface 600 may comprise a listing of the subset of the transactions relevant to the inquiry (e.g., transaction 504) and omitting or obscuring one or more of the transactions that are not amongst the subset relevant to the inquiry (e.g., transactions 502 and 506).

It will be appreciated that by omitting or obscuring the transaction(s) that are not amongst the subset relevant to the inquiry, associate interface 600 may help to ensure the customer's privacy. For example, transactions 502 and 506 may correspond to automatic deposit transactions from which the customer's salary might be inferred by the associate but which are not relevant to the customer's inquiry, which pertains to transaction 504 (e.g., a debit transaction with "<Merchant1>" that occurred on Wednesday). Similarly, one or more other transactions of the customer with the organization (e.g., the debit transactions with "<Merchant2>," "<Merchant3>," "<Merchant4>," "<Merchant5>," "<Merchant6>," and "<Merchant7>") may be irrelevant to the customer's inquiry, and associate interface 600 may help to ensure the customer's privacy by omitting or obscuring such transactions.

In some embodiments, associate interface 600, may omit or obscure each transaction in the listing that is not selected by the customer (e.g., via the user-selectable option(s)) as relevant to the inquiry. In other embodiments, associate interface 600, may fail to omit or obscure one or more of the transactions in the listing even though they were not selected by the customer (e.g., via the user-selectable option(s)) as relevant to the inquiry. For example, computing system 308 may examine data associated with the transaction(s) identified by the customer as relevant to the inquiry and may determine that one or more other transactions (e.g., transactions not selected by the customer as relevant to the inquiry) may be relevant to the inquiry (e.g., based on a determination that the other transaction(s) comprise data corresponding to data associated with the transaction(s) identified by the customer as relevant to the inquiry). For example, associate interface 600 may fail to omit or obscure the debit transactions with "<Merchant1>" that occurred on Monday, Tuesday, Thursday, and Friday, based on a determination that these transactions comprise data corresponding to data associated with transaction 504 (e.g., data indicating that the transactions were debit transactions with "<Merchant1>").

Returning to FIG. 4, at step 8, the customer may terminate a session associated with the inquiry (e.g., indicate that they have concluded their interaction with the associate), and, at step 9, computing device 304 may generate data indicating that the customer has concluded their interaction with the associate and may communicate (e.g., via network(s) 306) the data indicating that the customer has concluded their interaction with the associate to computing system 308, which may receive (e.g., via communication interface 314) the data indicating that the customer has concluded their interaction with the associate. At step 10, computing system 308 may generate data configured to cause computing device 302 to close (or clear) the associate interface and, at step 11, may communicate (e.g., via communication interface 314 and network(s) 306), to computing device 302, the data configured to cause computing device 302 to close the associate interface. Additionally or alternatively, computing system 308 may generate and communicate the data configured to cause computing device 302 to close the associate interface in response to determining that a predetermined amount of time has passed since the associate interface was communicated by computing system 308 to computing device 302. In some embodiments, computing system 308 may establish a voice over Internet protocol (VoIP) session between computing devices 302 and 304 (e.g., the customer and the associate may be remotely located from one another). In such embodiments, computing system 308 may generate and communicate the data configured to cause computing device 302 to close the associate interface in response to determining that the VoIP session has been terminated (e.g., that the associate or customer has terminated the VoIP session).

Figure 7:
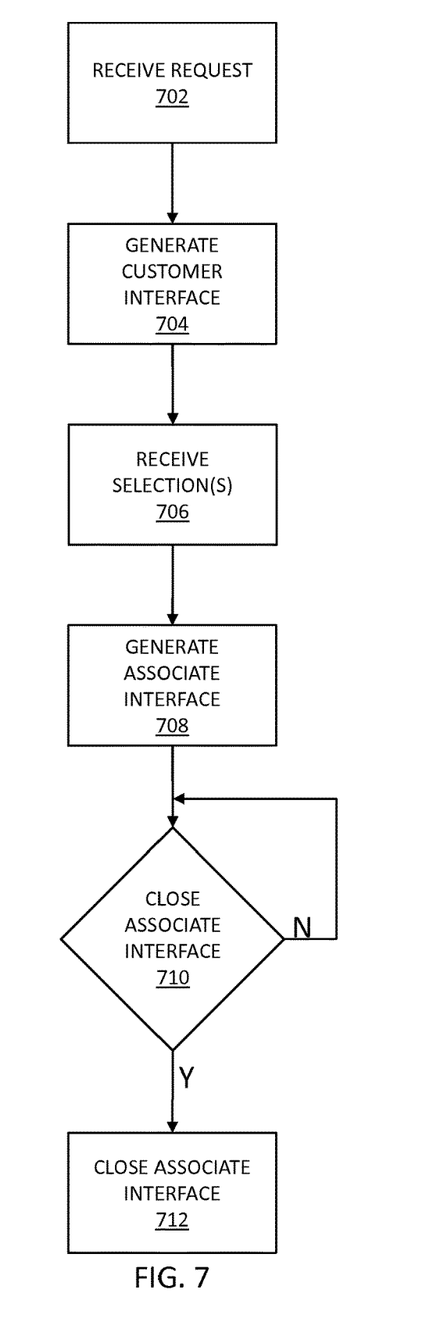
FIG. 7 depicts an illustrative method for employing customer-based associate interfaces in accordance with one or more example embodiments.

FIG. 7 depicts an illustrative method for employing customer-based associate interfaces in accordance with one or more example embodiments. Referring to FIG. 7, at step 702, a request indicating that a customer has initiated an inquiry may be received. For example, computing system 308 may receive, from computing device 302 and/or 304, a request indicating that a customer associated with computing device 304 has initiated an inquiry. At step 704, a customer interface comprising a listing of transactions of the customer and one or more user-selectable options for the customer to utilize to identify a subset of the transactions relevant to the inquiry may be generated. For example, computing system 308 may generate customer interface 500 and may communicate customer interface 500 to computing device 304. At step 706, data identifying the subset of the transactions relevant to the inquiry may be received. For example, computing system 308 may receive, from computing device 304, data identifying transaction 504. At step 708, an associate interface comprising a listing of the subset of the transactions relevant to the inquiry and omitting or obscuring one or more of the transactions that are not amongst the subset relevant to the inquiry may be generated. For example, computing system 308 may generate associate interface 600 and may communicate associate interface 600 to computing device 302. At step 710, a determination may be made regarding whether or not to close the associate interface. For example, computing system 308 may determine to close associate interface 600 and, at step 712, may generate data configured to cause computing device 302 to close associate interface 600 and may communicate, to computing device 302, the data configured to cause computing device 302 to close associate interface 600. Alternatively, computing system 308 may determine not to close associate interface 600, and the method may return to step 710 for a subsequent determination by computing system 308 regarding whether or not to close associate interface 600.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   generating, by at least one processor of a computing system comprising the at least one processor and a communication interface, a customer interface comprising a listing of a plurality of transactions of a customer of an organization with the organization and one or more user-selectable options for the customer to utilize to identify a subset of the plurality of transactions relevant to an inquiry of the customer;
   communicating, via the communication interface and to a computing device associated with the customer, the customer interface comprising the listing of the plurality of transactions and the one or more user-selectable options;
   receiving, via the communication interface and from the computing device associated with the customer, data, generated by the computing device associated with the customer in response to the customer invoking the one or more user-selectable options, identifying the subset of the plurality of transactions relevant to the inquiry of the customer;
   generating, by the at least one processor, an associate interface comprising a listing of the subset of the plurality of transactions relevant to the inquiry of the customer and omitting or obscuring one or more transactions of the plurality of transactions of the customer of the organization with the organization that are not amongst the subset of the plurality of transactions relevant to the inquiry of the customer;
   communicating, via the communication interface and to a computing device associated with an associate of the organization designated to assist the customer with the inquiry, the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer;
   establishing, by the at least one processor and via the communication interface, a voice over Internet protocol (VoIP) session between the computing device associated with the customer and the computing device associated with the associate; and
   responsive to determining that the VoIP session has been terminated:
      generating, by the at least one processor, data configured to cause the computing device associated with the associate to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer; and
      communicating, via the communication interface and to the computing device associated with the associate, the data configured to cause the computing device associated with the associate of the organization to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer.

2. The method of claim 1, wherein:

the computing device associated with the customer comprises a mobile device executing an application provided by the organization;

generating the customer interface comprising the listing of the plurality of transactions and the one or more user-selectable options comprises generating an interface, configured for the application provided by the organization, comprising the listing of the plurality of transactions and the one or more user-selectable options; and receiving the data identifying the subset of the plurality of transactions relevant to the inquiry of the customer comprises receiving data generated by the mobile device in response to the customer invoking, via the application provided by the organization, the one or more user-selectable options.

3. The method of claim 1, wherein:

the organization comprises a financial institution;

the computing device associated with the customer comprises an automated (or automatic) teller machine (ATM);

generating the customer interface comprising the listing of the plurality of transactions and the one or more user-selectable options comprises generating an interface, configured for the ATM, comprising the listing of the plurality of transactions and the one or more user-selectable options; and receiving the data identifying the subset of the plurality of transactions relevant to the inquiry of the customer comprises receiving data generated by the ATM in response to the customer invoking, via the ATM, the one or more user-selectable options.

4. The method of claim 1, wherein:

the organization comprises a financial institution;

the computing device associated with the customer comprises a kiosk comprising a touchscreen display, the kiosk being physically located at a branch location of the financial institution where the computing device associated with the associate, the associate, and the customer are physically located, and the kiosk being physically oriented such that the touchscreen is visible to the customer and obscured from the associate;

generating the customer interface comprising the listing of the plurality of transactions and the one or more user-selectable options comprises generating an interface, configured for the kiosk, comprising the listing of the plurality of transactions and the one or more user-selectable options; and receiving the data identifying the subset of the plurality of transactions relevant to the inquiry of the customer comprises receiving data generated by the kiosk in response to the customer invoking, via the touchscreen, the one or more user-selectable options.

5. The method of claim 1, comprising, responsive to receiving, via the communication interface and from the computing device associated with the customer of the organization, data indicating that the customer has concluded their interaction with the associate:

generating, by the at least one processor, data configured to cause the computing device associated with the associate to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer; and communicating, via the communication interface and to the computing device associated with the associate, the data configured to cause the computing device associated with the associate of the organization to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer.

6. The method of claim 1, comprising, responsive to determining that a predetermined amount of time has passed since the associate interface was communicated by the computing system to the computing device associated with the associate:

generating, by the at least one processor, data configured to cause the computing device associated with the associate to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer; and communicating, via the communication interface and to the computing device associated with the associate, the data configured to cause the computing device associated with the associate of the organization to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer.

7. A computing system comprising:

a communication interface;

at least one processor; and a memory comprising instructions that when executed by the at least one processor cause the computing system to:

generate a customer interface comprising a listing of a plurality of transactions of a customer of an organization with the organization and one or more user-selectable options for the customer to utilize to identify a subset of the plurality of transactions relevant to an inquiry of the customer;

communicate, via the communication interface and to a computing device associated with the customer, the customer interface comprising the listing of the plurality of transactions and the one or more user-selectable options;

receive, via the communication interface and from the computing device associated with the customer, data, generated by the computing device associated with the customer in response to the customer invoking the one or more user-selectable options, identifying the subset of the plurality of transactions relevant to the inquiry of the customer;
generate an associate interface comprising a listing of the subset of the plurality of transactions relevant to the inquiry of the customer and omitting or obscuring one or more transactions of the plurality of transactions of the customer of the organization with the organization that are not amongst the subset of the plurality of transactions relevant to the inquiry of the customer;
communicate, via the communication interface and to a computing device associated with an associate of the organization designated to assist the customer with the inquiry, the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer;
establish, via the communication interface, a voice over Internet protocol (VoIP) session between the computing device associated with the customer and the computing device associated with the associate; and
responsive to determining that the VoIP session has been terminated:
generate data configured to cause the computing device associated with the associate to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer; and
communicate, via the communication interface and to the computing device associated with the associate, the data configured to cause the computing device associated with the associate of the organization to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer.

8. The computing system of claim 7, wherein the computing device associated with the customer comprises a mobile device executing an application provided by the organization, and wherein the instructions, when executed by the at least one processor, cause the computing system to:
generate an interface, configured for the application provided by the organization, comprising the listing of the plurality of transactions and the one or more user-selectable options; and
receive data generated by the mobile device in response to the customer invoking, via the application provided by the organization, the one or more user-selectable options.

9. The computing system of claim 7, wherein the organization comprises a financial institution, the computing device associated with the customer comprises an automated (or automatic) teller machine (ATM), and wherein the instructions, when executed by the at least one processor, cause the computing system to:
generate an interface, configured for the ATM, comprising the listing of the plurality of transactions and the one or more user-selectable options; and
receive data generated by the ATM in response to the customer invoking, via the ATM, the one or more user-selectable options.

10. The computing system of claim 7, wherein the organization comprises a financial institution, the computing device associated with the customer comprises a kiosk comprising a touchscreen display, the kiosk being physically located at a branch location of the financial institution where the computing device associated with the associate, the associate, and the customer are physically located, and the kiosk being physically oriented such that the touchscreen is visible to the customer and obscured from the associate, and wherein the instructions, when executed by the at least one processor, cause the computing system to:
generate an interface, configured for the kiosk, comprising the listing of the plurality of transactions and the one or more user-selectable options; and
receive data generated by the kiosk in response to the customer invoking, via the touchscreen, the one or more user-selectable options.

11. The computing system of claim 7, wherein the instructions, when executed by the at least one processor, cause the computing system to, responsive to receiving, via the communication interface and from the computing device associated with the customer of the organization, data indicating that the customer has concluded their interaction with the associate:
generate data configured to cause the computing device associated with the associate to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer; and
communicate, via the communication interface and to the computing device associated with the associate, the data configured to cause the computing device associated with the associate of the organization to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer.

12. The computing system of claim 7, wherein the instructions, when executed by the at least one processor, cause the computing system to, responsive to determining that a predetermined amount of time has passed since the associate interface was communicated by the computing system to the computing device associated with the associate:
generate data configured to cause the computing device associated with the associate to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer; and communicate, via the communication interface and to the computing device associated with the associate, the data configured to cause the computing device associated with the associate of the organization to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer.

13. One or more non-transitory computer-readable media comprising instructions that when executed by at least one processor of a computing system comprising a communication interface cause the computing system to:
generate a customer interface comprising a listing of a plurality of transactions of a customer of an organization with the organization and one or more user-selectable options for the customer to utilize to identify a subset of the plurality of transactions relevant to an inquiry of the customer;
communicate, via the communication interface and to a computing device associated with the customer, the customer interface comprising the listing of the plurality of transactions and the one or more user-selectable options;
receive, via the communication interface and from the computing device associated with the customer, data, generated by the computing device associated with the customer in response to the customer invoking the one or more user-selectable options, identifying the subset of the plurality of transactions relevant to the inquiry of the customer;
generate an associate interface comprising a listing of the subset of the plurality of transactions relevant to the inquiry of the customer and omitting or obscuring one or more transactions of the plurality of transactions of the customer of the organization with the organization that are not amongst the subset of the plurality of transactions relevant to the inquiry of the customer;
communicate, via the communication interface and to a computing device associated with an associate of the organization designated to assist the customer with the inquiry, the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer;
establish, via the communication interface, a voice over Internet protocol (VoIP) session between the computing device associated with the customer and the computing device associated with the associate; and
responsive to determining that the VoIP session has been terminated:
generate data configured to cause the computing device associated with the associate to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer; and communicate, via the communication interface and to the computing device associated with the associate, the data configured to cause the computing device associated with the associate of the organization to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer.

14. The one or more non-transitory computer-readable media of claim 13, wherein the computing device associated with the customer comprises a mobile device executing an application provided by the organization, and wherein the instructions, when executed by the at least one processor, cause the computing system to:
generate an interface, configured for the application provided by the organization, comprising the listing of the plurality of transactions and the one or more user-selectable options; and
receive data generated by the mobile device in response to the customer invoking, via the application provided by the organization, the one or more user-selectable options.

15. The one or more non-transitory computer-readable media of claim 13, wherein the organization comprises a financial institution, the computing device associated with the customer comprises an automated (or automatic) teller machine (ATM), and wherein the instructions, when executed by the at least one processor, cause the computing system to:
generate an interface, configured for the ATM, comprising the listing of the plurality of transactions and the one or more user-selectable options; and
receive data generated by the ATM in response to the customer invoking, via the ATM, the one or more user-selectable options.

16. The one or more non-transitory computer-readable media of claim 13, wherein the organization comprises a financial institution, the computing device associated with the customer comprises a kiosk comprising a touchscreen display, the kiosk being physically located at a branch location of the financial institution where the computing device associated with the associate, the associate, and the customer are physically located, and the kiosk being physically oriented such that the touchscreen is visible to the customer and obscured from the associate, and wherein the instructions, when executed by the at least one processor, cause the computing system to:
generate an interface, configured for the kiosk, comprising the listing of the plurality of transactions and the one or more user-selectable options; and
receive data generated by the kiosk in response to the customer invoking, via the touchscreen, the one or more user-selectable options.

17. The one or more non-transitory computer-readable media of claim 13, wherein the instructions, when executed by the at least one processor, cause the computing system to, responsive to receiving, via the communication interface and from the computing device associated with the customer of the organization, data indicating that the customer has concluded their interaction with the associate:
generate data configured to cause the computing device associated with the associate to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer; and communicate, via the communication interface and to the computing device associated with the associate, the data configured to cause the computing device associated with the associate of the organization to close the associate interface comprising the listing of the subset of the plurality of transactions relevant to the inquiry of the customer and omitting or obscuring the one or more transactions of the plurality of transactions of the customer of the organization with the organization that are not amongst the subset of the plurality of transactions relevant to the inquiry of the customer.

\* \* \* \* \*